(12) United States Patent
Neble et al.

(10) Patent No.: US 7,979,722 B2
(45) Date of Patent: Jul. 12, 2011

(54) FLASH MEMORY DISTRIBUTION OF DIGITAL CONTENT

(76) Inventors: Rhyan Neble, McCall, ID (US);
Michael W. Anderson, McCall, ID (US)

( * ) Notice: Subject to any disclaimer, the term of this patent is extended or adjusted under 35 U.S.C. 154(b) by 116 days.

(21) Appl. No.: 12/418,527

(22) Filed: Apr. 3, 2009

(65) Prior Publication Data
US 2010/0205456 A1 Aug. 12, 2010

Related U.S. Application Data

(63) Continuation of application No. 10/927,936, filed on Aug. 27, 2004, now Pat. No. 7,536,558.

(51) Int. Cl.
*G06F 12/14* (2006.01)
*G06F 11/30* (2006.01)
*H04L 9/00* (2006.01)
*H04K 1/00* (2006.01)
*G06F 7/04* (2006.01)
*G06F 17/30* (2006.01)
*G06K 9/00* (2006.01)
*H04L 9/32* (2006.01)

(52) U.S. Cl. ............ 713/189; 713/168; 726/9; 380/265; 380/277; 380/278

(58) Field of Classification Search ........................ None
See application file for complete search history.

(56) References Cited

U.S. PATENT DOCUMENTS

| | | | |
|---|---|---|---|
| 5,982,891 A | 11/1999 | Ginter et al. | |
| 6,266,416 B1 * | 7/2001 | Sigbjørnsen et al. | 380/255 |
| 6,957,342 B2 * | 10/2005 | Vatanen | 713/192 |
| 7,073,059 B2 * | 7/2006 | Worely et al. | 713/168 |
| 2002/0012432 A1 | 1/2002 | England et al. | |
| 2002/0049677 A1 | 4/2002 | Yamada et al. | |
| 2002/0129245 A1 * | 9/2002 | Cassagnol et al. | 713/168 |
| 2003/0093683 A1 | 5/2003 | Wong et al. | |
| 2003/0159062 A1 | 8/2003 | Tozawa et al. | |
| 2003/0163717 A1 | 8/2003 | Yoshimoto et al. | |
| 2004/0218762 A1 * | 11/2004 | Le Saint et al. | 380/277 |
| 2004/0221175 A1 * | 11/2004 | Athens et al. | 713/201 |

FOREIGN PATENT DOCUMENTS

| | | |
|---|---|---|
| EP | 1 313 108 A3 | 5/2003 |
| WO | WO 99/39475 A | 8/1999 |

OTHER PUBLICATIONS

European Patent Office, Standard Search Report, Branch at the Hague, 2290 HV Rijswijk (ZH), Apr. 17, 2007, pp. 1-6.
Letham, Lawrence, Hoff, David, and Folmsbee, Alan, A 128K EPROM Using Encryption of Pseudorandom Numbers to Enable Read Access, IEEE Journal of Solid-State Circuits, vol. SC-21, No. 5, Oct. 1986, pp. 881-888.

* cited by examiner

*Primary Examiner* — Shin-Hon Chen
(74) *Attorney, Agent, or Firm* — Michael C. Martensen

(57) ABSTRACT

Methods, apparatuses, and computer-readable media for distributing digital content. One embodiment comprises an apparatus comprising: a device (100) communications bus; coupled to the device communications bus (150), a bi-directional communications controller (110) capable of communicatively interfacing with a computer (710); coupled to the device communications bus (150), an integrated processor (130) capable of executing (270) computer-executable instructions; and coupled to the integrated processor (130), a storage module (140) capable of storing computer-executable instructions.

5 Claims, 7 Drawing Sheets

FLASH MEMORY DISTRIBUTION OF DIGITAL CONTENT

CROSS REFERENCE TO RELATED APPLICATIONS

The present application claims priority from, and is a Continuation of, U.S. patent application Ser. No. 10/927,936 filed Aug. 27, 2004, which is related to the subject matter disclosed in U.S. Provisional Patent Application Ser. No. 60/499,053 filed on Aug. 29, 2003, assigned to the assignee of the present invention, the disclosures of which are herein specifically incorporated by this reference in their entireties.

TECHNICAL FIELD

The present invention relates to distributing software, and more particularly to using nonvolatile flash memory to distribute software.

BACKGROUND ART

Electronic memory comes in a variety of forms to serve a variety of purposes. Nonvolatile flash memory devices, such as electrically erasable and programmable read only memories (EEPROMs), are used in a wide assortment of applications, including computers, integrated circuit (IC) cards, digital cameras, camcorders, communication terminals, communication equipment, medical equipment, and automobile control systems. In these roles, flash memory is used more as a hard drive than as Random Access Memory (RAM). Nonvolatile flash memory is considered a solid state storage device. Solid state devices do not have moving parts—everything is electronic instead of mechanical.

A few examples of nonvolatile memory include a computer's Basic Input/Output System (BIOS) chip, CompactFlash, SmartMedia, Memory Stick (all three of which are often found in digital cameras), PCMCIA Type I and Type II memory cards (used as solid-state disks in laptops), and memory cards for video game consoles. Other removable nonvolatile memory products include Sony's Memory Stick, PCMCIA memory cards, and memory cards for video game systems.

Nonvolatile memory possesses several inherent advantages. Nonvolatile memory is noiseless, it allows faster access to stored data than media involving moving mechanical apparatuses such as a disk drive, it is typically smaller than most hard drives, it is lighter on a storage capacity per ounce basis, and it has no moving parts. Nonvolatile memory is, however, expensive as compared to more traditional forms of storage media, such as a hard disk drive or compact disk. For that and other reasons, nonvolatile memory has not been used to distribute digital content.

Today, digital content is distributed through a variety of means. Typically, a disk containing the digital content is read by a device or installed on a computer's hard drive, or similar storage media, through a variety of procedures. Digital content is also distributed across networks via downloading. There are significant problems associated with these systems. Since the software needs to be installed, untrained third parties are responsible for actually delivering digital content products to the end consumer. Additionally, the end consumer may have little experience or understanding in the underlying processes that are performed during installation. The installation media and digital content are also subject to corruption before, during, and after the installation process. As a result, digital content such as software is repeatedly re-installed during its useful lifetime, reducing its productivity and efficiency. Lastly, installing digital content under this process is not secure.

Despite the security systems that a digital content provider may impose on a customer to unlock or decode digital content during its installation, all decoding schemes that process information through the computer's central processing unit are vulnerable to hacking. Fundamentally, the digital content is communicated across the computer's system bus, which is vulnerable to intrusion. The Internet, along with inexpensive CD duplicating hardware, has made it possible for anyone to pirate thousands of dollars worth of digital content in a matter of minutes. This is complicated by the fact that the fidelity of pirated digital content from an illicit source is identical to that of the original version. Revenue lost to piracy of digital content is staggering and continues to grow. Thus, there is a continuing need to protect digital content reliably. This need continues to drive security schemes to exceedingly high levels of sophistication.

As schemes to protect digital content become more convoluted, end users are forced to deal with an ever broadening array of technical issues. This scenario is further exasperated by the realization that installed digital content is increasingly prone to corruption. Subsequent installations of other digital content may replace or alter fundamental portions of a previous installation, leaving software or similar digital content useless. Hard drives are subject to physical wear and tear, and the magnetic fields that hold data may degrade. As end consumers become less aware of the underlying structure and installation process, they rely more and more on expert advice. As a result, support requirements and customer service costs have skyrocketed.

There remains a need to distribute digital content securely in a cost effective and reliable manner. The present invention addresses these and other problems, as well as provides additional benefits.

DISCLOSURE OF INVENTION

Methods, apparatuses, and computer-readable media for securely distributing digital content. One embodiment comprises an apparatus comprising: a device (100) communications bus; coupled to the device communications bus (150), a bi-directional communications controller (110) capable of communicatively interfacing with a computer (710); coupled to the device communications bus (150), an integrated processor (130) capable of executing (270) computer-executable instructions; and coupled to the integrated processor (130), a storage module (140) capable of storing computer-executable instructions.

BRIEF DESCRIPTION OF THE DRAWINGS

These and other more detailed and specific objects and features of the present invention are more fully disclosed in the following specification, reference being had to the accompany drawings, in which.

DETAILED DESCRIPTION OF THE PREFERRED EMBODIMENTS

The present invention distributes digital content using nonvolatile memory. A nonvolatile memory distribution system provides digital content in a ready-to-run state. Installation is not required, nor is the digital content subject to degradation or piracy.

The present invention offers the following advantages over the prior art:
cross platform compatibility of digital content;
secure delivery of digital content;
dynamic encryption environment;
reliable functionality of application software;
reduction in customer support cost;
instantaneous access to software applications;
faster execution of digital content; and
maintenance free utility.

Distribution of digital content via flash memory provides a secure means to deliver reliable digital content to a variety of platforms. Flash memory devices are treated universally as removable storage devices when coupled to a computer, processor, or similar device. The present invention capitalizes on this functionality within the BIOS of the controlling chip of the computer 710. The present invention initializes itself as a new device to the operating system of a computer 710. The operating system of the computer 710 recognizes a new piece of hardware that provides functionality of the digital content without further action on the part of the operating system. The digital content residing on the storage module 140 is never visible to the central processing unit of the host device 710, making the content secure from piracy, corruption, incompatible software, and attack from malicious computer code. For purposes of this patent application, malicious computer code comprises computer code commonly referred to as computer viruses, worms, Trojan horses, spam, spy-ware, and any other type of unauthorized or unsolicited computer code that appears in or on a computer without an authorized user's knowledge and/or without an authorized user's consent.

Figure 1:
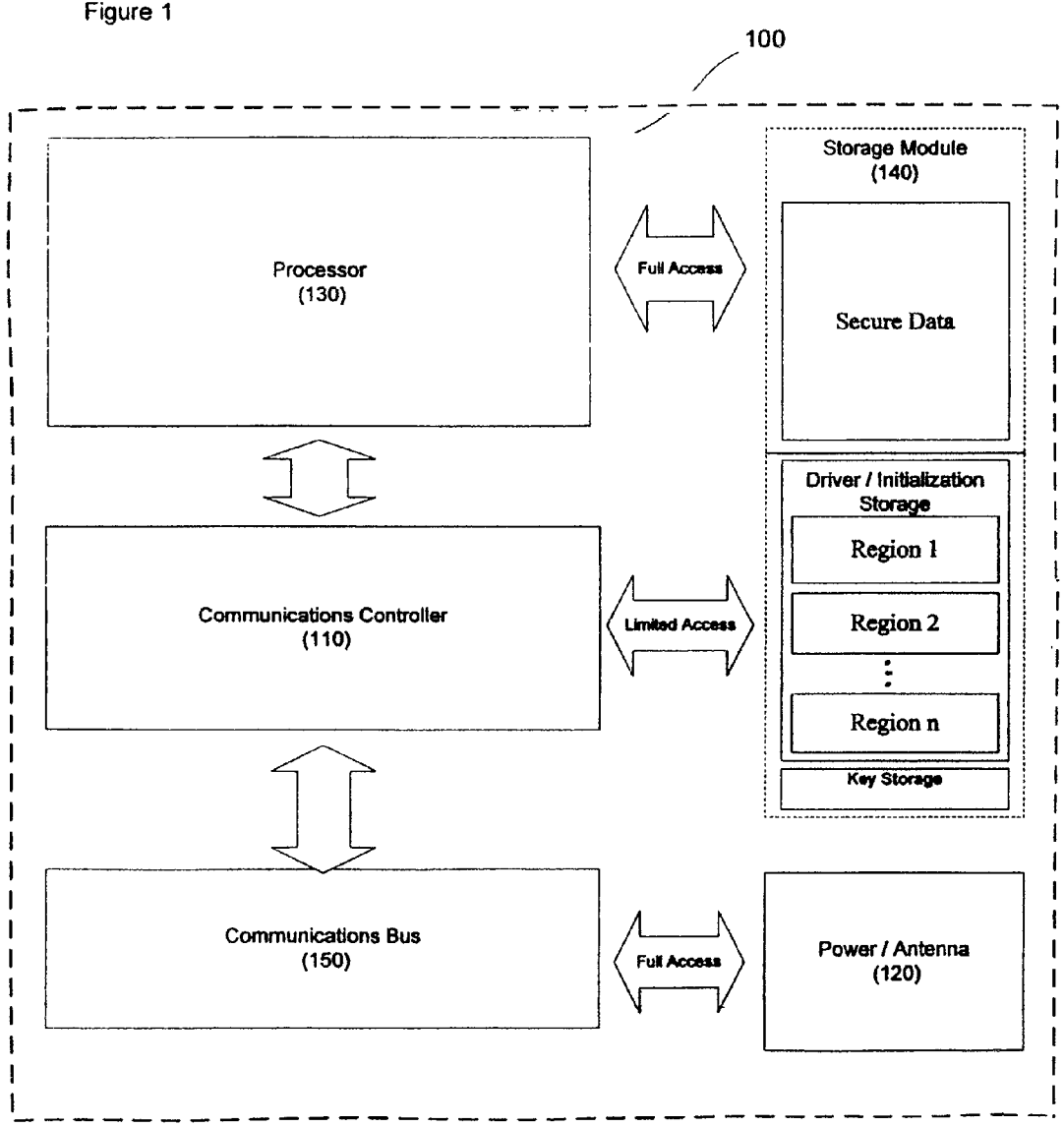
FIG. 1 is a block diagram of one apparatus embodiment of the present invention for securely distributing digital content.

One embodiment of an apparatus for distributing digital content using nonvolatile memory is shown in FIG. 1. The distribution device 100 comprises a communications controller 110, an integrated processor 130, and a storage module 140. A communications bus 150 communicatively couples the communications controller 110 to the integrated processor 130. The integrated processor 130 couples with and directly communicates to the storage module 140 for transfer of secure information. In an alternative embodiment, a distinct storage module 140 or memory partition is communicatively coupled to the communications controller 110 via the communications bus 150. This partition or distinct storage module 140 can house drivers allowing the host computer 170 to recognize the storage device 100. The remaining digital content can be stored on a separate partition or distinct storage module 140 only accessible through the integrated processor 130. In alternative embodiments, the distribution device 100 may comprise other components such as a power source for standalone operations or an antenna 120 for wireless communications. Further, the storage module 140 or modules comprise, in one embodiment, a flash nonvolatile memory environment.

As described herein, the communications controller 110 communicates, in one embodiment, drivers that enable the distribution device 100 to communicate with a host computer 710 or host device. From the host computer's 710 perspective, the communications controller 110 enables the distribution, access, and initialization of the storage module 140 as a new and different piece of hardware. In one embodiment, the distribution device 100 appears to the host computer 710 as directly accessible executable instructions, software applications, and/or digitally encoded audio, or video. This prevents a resulting change in drive-letters during a removal and subsequent reinstallation of the distribution device 100. Typically, when a memory device or additional drive is added to a host computer, the device or drive is assigned a letter. Traditionally the host's hard drive is given the "C" letter designation, a compact disk drive is typically given the "E" designation and so forth. In situations where the host computer 710 is a member of a network the designations may involve several letters of the alphabet. In the present invention, the distribution device remains functionally operational regardless of what letter designation the host computer places on the drive.

Such independence allows the distribution device 100 to be customized for each application and to be installed in the host computer as a plug-and-play device independent of drive letters. For example, if a flash memory device using the present invention is installed into a computer via its USB port, the computer will readily recognize the new installation of the memory card as a particular piece of hardware. The host computer does not know, nor does it care, what is on the flash memory card. The computer 710 may interact with the flash memory card, but from the operating system perspective, the card is recognized as an additional piece of equipment. From the card's perspective, it has gained access to the computer's processor and graphical user interface, and may begin offering its capabilities to the host computer 710. The present invention is recognized by the host computer 710 as a distribution device 100 module that is ubiquitous, rather than a drive. What is installed into the operating system is the device 100 itself, not the software contained on the device 100.

Internally, the integrated processor 130 accesses data stored in the memory module 140 on the distribution device 100 directly, and internally emulates standard drive operations for drive dependant features of client software. In an alternative embodiment, direct hardware calls are executed by software designed specifically to access media contained on the distribution device 100. The communications controller 110 functions to eliminate the need for platform specific software development. Applications processed internally on the distribution device 100 are platform independent, with the driver being the only platform specific element required for proper operation.

In a distributed application environment, the communications controller 100 also serves to register the services and capabilities of the distribution device 100 with a peer device and/or coordinating device(s). Other ancillary items, such as a software icon and registry settings, are installed during driver installation, along with a device enumeration code that is a unique identification for the client application.

In one embodiment, the storage module 140 of the distribution device 100 is partitioned. One such partition is a boot region. The boot region comprises a read only executable program that loads upon initial connection of the distribution device 100 to a computer or similar device with processing capability. This program's function is to load drivers for the distribution device 100 and initialize the software access or installation routine. In one embodiment, the boot region initializes a traditional installation procedure for application software maintained in the storage module 140. The application software is installed to the computer 710 through the integrated processor 130 and communications controller 110 of the distribution device 100.

In an alternate embodiment, a driver for a security or encryption scheme, as would be known to one skilled in the relevant art, is installed by the communications controller 110. The driver integrates the distribution device 100 with its client application. An installation routine then installs a portion of the software to the computer's hard drive, while leaving some elements of the application within the distribution device's nonvolatile memory 140. In yet another embodiment for establishing communications with the host computer 710, a driver is installed that creates a new class of hardware on the host system. The new distribution device's hardware class initializes all distribution device enabled software as plug and play hardware components within the host system. This initialization eliminates any issues with drive letter enumeration that would interfere with the proper operation of software located on the distribution device 100. It is also contemplated in another embodiment that the BIOS of the host system recognizes the distribution device's boot region as a bootable disk initializing the distribution device 100 module as the system's boot disk. This facilitates a distribution device 100 based operating system that is fast, reliable, and resistant to viral infection.

A second partition of the storage module 140 can be a user data region. The user data region is recognized by the computer as a separate drive and can be encrypted or write protected through techniques known to one skilled in the relevant art. Furthermore, documents associated with a parent application can be stored on the distribution device 100, making it convenient to keep the data and software together when moving between or among different host systems.

When the distribution device 100 supports operating system software, a portion of the storage module 140 is reserved for caches of dynamic user settings, unused wallpapers and screen savers, temporary files, print buffers, archived email, deleted files folder, device drivers, software settings and other hardware configurations. Temporary elements of the operating system may be stored in system RAM to reduce deterioration on the distribution device 100.

It is also contemplated that the storage module 140 can be further partitioned to include an extensible region, an update region, and/or a utility region. The extensible region can be designed for the storage of application extensions. The contents of this region will not initialize unless the plug-ins are certified as extensions to the client application. Updates stored in the update region may execute from within the distribution device 100, verify the integrity of the data, and disable read access to the entire distribution device 100 while performing a reversible update to the client application. The device then resets itself, forcing a redetection of the device. The utility region can include, in one embodiment, an encrypted region containing executable utilities specific to the individual distribution device's 100 client application.

In one embodiment, the storage module 140 comprises flash memory elements. Traditionally, the photo positive for the thin film oxide layer of some types of flash memory comprise a uniform array. The thin film oxide is the actual storage medium for each of the millions of bits contained in the storage module 140. In another embodiment of the present invention, the memory modules could be fixed. Fixed memory modules use a custom array pattern, a type of physical memory map, to store software or other digital content, at the die level, as it would appear as flash memory. This allows for rapid and inexpensive production from photographic masters of software stored within permanently charged fixed memory arrays. Fixed memory modules of this kind are more durable, faster, and more readily usable than traditional media like CDs, DVDs and the like.

The integrated processor 130 is not vender specific. As demand on system architecture increases, the speed and capability of the processor becomes more important. The electrically erasable programmable random access memory (EEPRAM), i.e., flash memory or fixed memory modules, are ideally integrated into the processor as a L2 (level 2) or L3 (level 3) cache within the die; but may initially be installed as an element entirely separate from the memory elements.

In one embodiment of the present invention, a distributed application support system comprises multiple distribution devices 100 that host the same client application sharing processing power. This is accomplished by using multithreading support within the client application. This capability is facilitated by the drivers of the distribution device 100. It is also possible for distribution devices housing dissimilar applications to coordinate their transactions. In that embodiment, a controller module hosts an operating system client application and functions as a boot device.

Data concerning the integrated processor 130 is housed in a portion of the nonvolatile memory 140 that is permanently encrypted. Based on fixed encryption security (FES), the contents of the secured portion of the distribution device 100 are encrypted with the internal serial number or similar identification means of the integrated processor 130. The integrated processor 130 acts to decrypt the data in real time and potentially faster than the host computer can access the device as the application is executed. Effectively, this procedure creates a "looking glass" or one-way mirror security scenario. Once data is placed in the secure flash memory, the data is write protected and is "visible" only within the module. The secure flash memory module can be an independent integrated circuit isolated physically from the other memory components, or it can be part of a shared nonvolatile memory 140, since access is regulated by the integrated processor 130. In a typical embodiment, the largest storage location in a distribution device 100 is never directly accessible to the end user. When the distribution device 100 houses application software, the software is encrypted and stored in this location. In the case of an operating system device, the operating system's core files are stored in secure flash memory. Dynamic content is stored in another portion of the nonvolatile memory 140.

Figure 2:
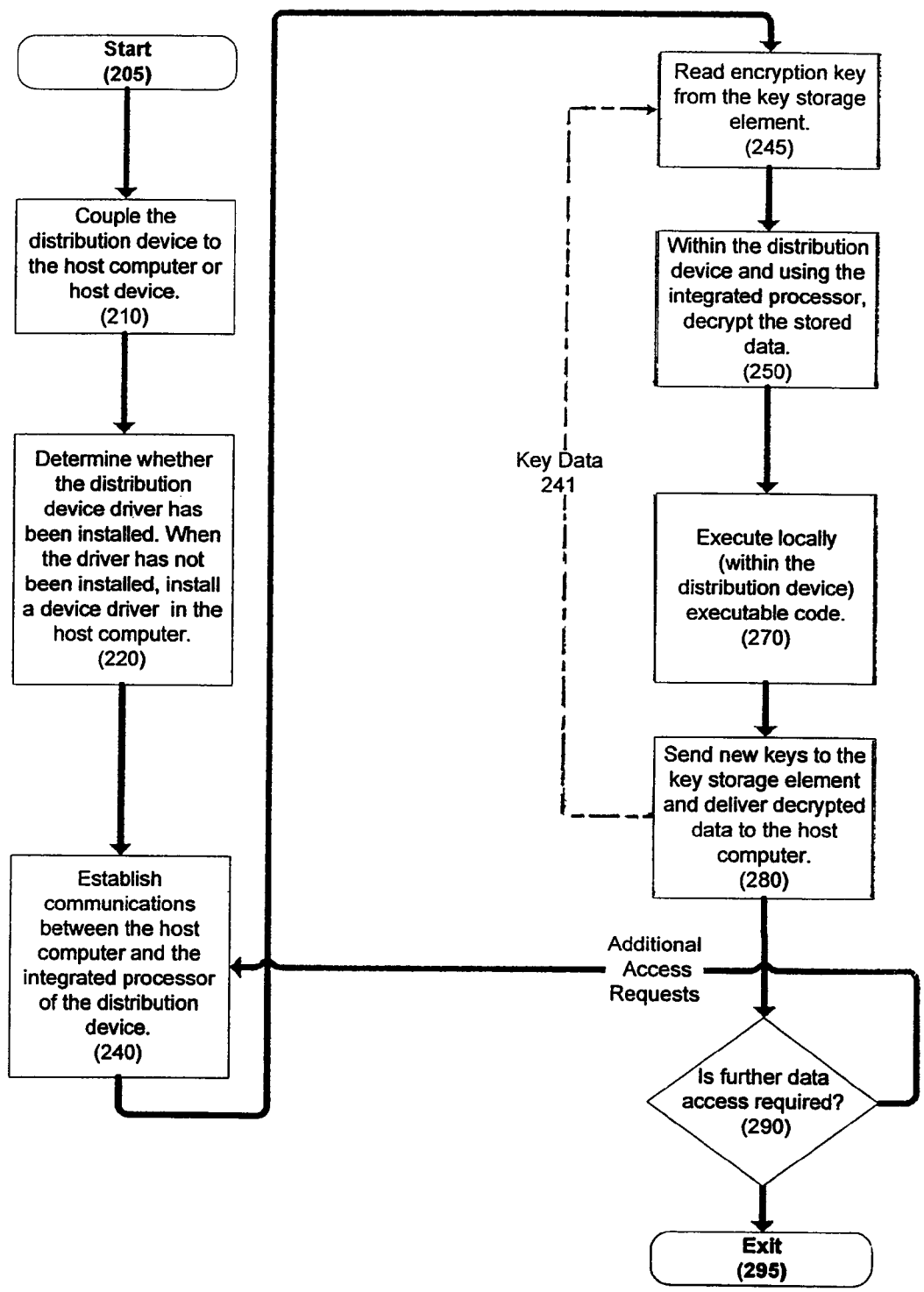
FIG. 2 is a flow diagram of one method embodiment of the present invention for securely distributing digital content.
Figure 3:
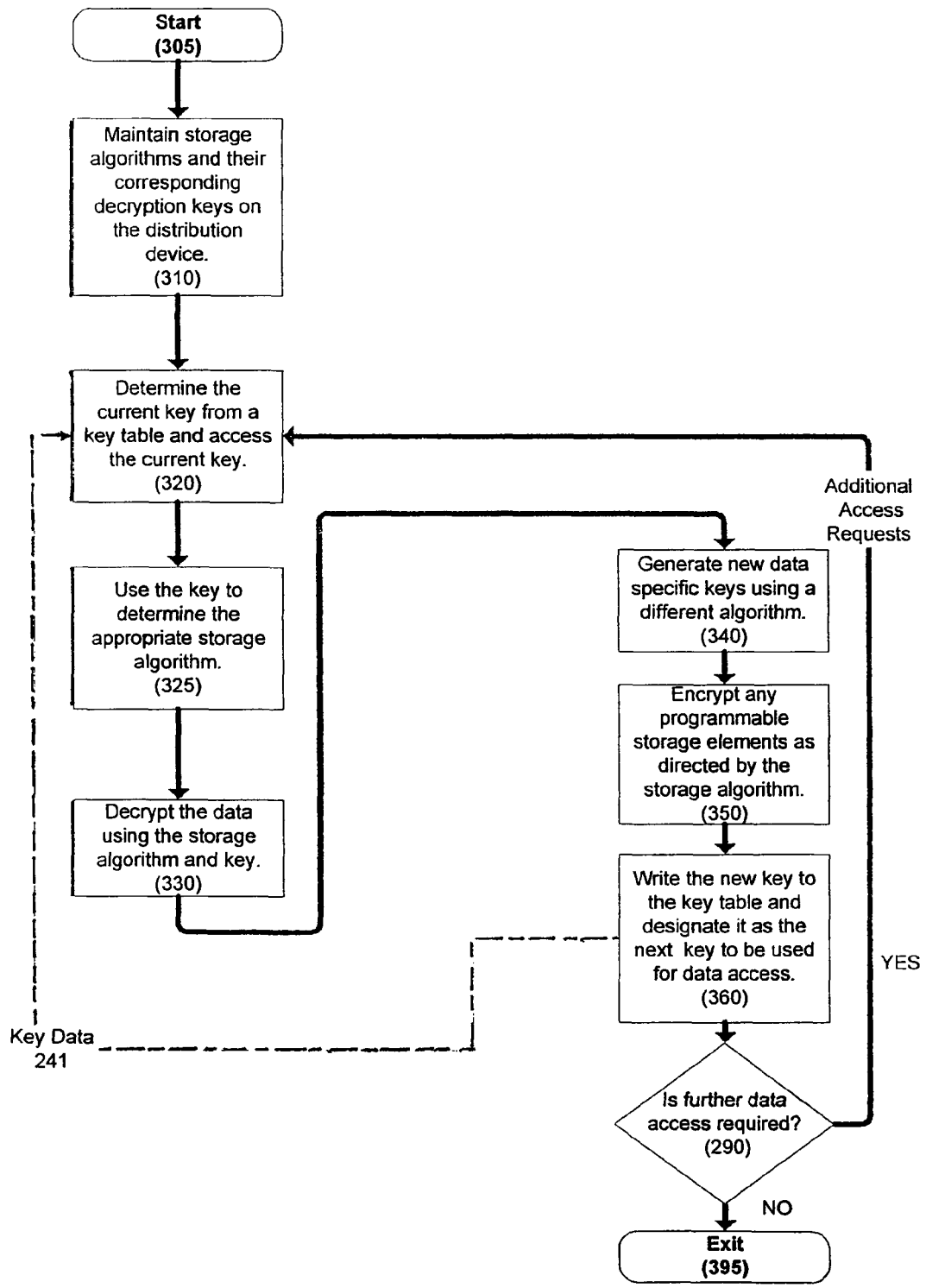
FIG. 3 is a flow diagram of one method embodiment of the present invention for securing digital content using dynamic encryption keys.

One embodiment of a method for securely distributing digital content using nonvolatile memory is shown in FIG. 2. The method begins by communicatively coupling 210 the distribution device 100 to the computer via a communications controller 110. Upon initial connection, a driver is installed 220 in the computer that allows the computer to recognize and communicate with the distribution device 100. In another embodiment, the communications driver for the distribution device 100 may be preinstalled in the computer. Once connected, the computer recognizes the distribution device 100 as a new piece of hardware or as an additional drive depending on the specific requirements of the data.

The integrated processor 130 of the distribution device 100 establishes the ability to communicate 240 data to the computer 710 via the communications controller 110. An encryption key 241 is then read 245 from a key storage element within the distribution device. Internal to the distribution device 100, computer-readable instructions stored in the device's nonvolatile memory 140 are decrypted 250. Once the computer-readable instructions are decrypted 250, the integrated processor 130 executes 270 those instructions found in the storage module 140 including, but not limited to, application execution, file manipulation, and encryption processing. At this time the integrated processor 130 can generate a new encryption key 241 that is then loaded into the key storage element. The resulting data may then be communicated 280 back to the host computer 710. The host computer 710 does not interact directly with the encryption/decryption of the distribution device 100 and, in some instances, does not interact with the executable instructions of the application. The device-executable instructions (computer-readable instructions executed on the device) that reside on the distribution device 100 are never communicated across the host computer's system bus. As there is no direct host computer 710 interface with the device-executable instructions, the software is isolated on the distribution device 100 and cannot be pirated, nor can it be corrupted by other applications. The reliability of the software is thus enhanced, reducing support costs and increasing user satisfaction.

In another embodiment, the encryption scheme is based on different storage methodologies that correspond to media specific encryption keys. These storage algorithms determine how to address, translate, decode, and process the data stored on the device 100. The storage algorithms are typically dependent on symbiotic key codes to process and decode the stored data. In the absence of an encryption key 241, no translation is performed on the data and it is passed through the integrated processor 130 unchanged. In another embodiment of the present invention, the nature of the encryption key 241 may aid the processor 130 in determining what storage algorithm to use to access the data. The keys 241 are specific to associated data and may be updated as determined by the algorithms.

An alternative to a fixed encryption scheme for the protection of the computer-executable instructions, and an embodiment of the present invention, is a dynamic encryption methodology. In dynamic encryption, the distribution device 100 maintains 310 multiple storage algorithms and multiple encryption keys 241. Only one storage algorithm can be active at a time; however multiple keys 241 can facilitate different operations simultaneously within the integrated processor 130. Initially, the appropriate encryption key 241 is loaded 320 from the distribution device which can then aid in the determination 325 of the appropriate storage algorithm. Using the encryption key 241 and associated algorithm, data is decrypted 330 for use by the integrated processor 130. During free clock cycles, a new key 241 is generated 340 and the integrated processor 130 encrypts 350 any programmable storage location as directed by the storage algorithm. A new key 241 may then be written to a portion of the storage element 140 designated 360 as the current key 241 for data processing 330.

The generation of a new key 241 is controlled by the storage algorithms. The algorithms also determine when the cycle repeats itself 370, generating an alternate key 241 and alternate algorithm. In the case of programmable storage the storage algorithm can alter 270 the storage location and encryption of the data so that should a third party be able to guess or derive a valid encryption key 241, the pirated key 241 will only be valid for a fraction of a second. Algorithms used to generate a new key 241, and periodically alter the encryption of any materials on the distribution device 100, are well known to one skilled in the relevant art. Furthermore, the encryption process is internal to the integrated processor 130 and thus not accessible via the communications controller 110 or any outside source, making the distribution device 100 secure from outside intrusion, piracy, and attack by malicious code.

To hack into encrypted data, the hacker must observe the decryption of the data and emulate the encryption key 241. For the hacker to succeed, the encryption key 241 and the algorithm used to encrypt the data must remain constant while the hacker imitates the key 241 and attempts to gain illegally access to the encrypted data. Dynamic encryption prevents this by changing the encryption key 241 faster than the hacker can access the data. Essentially, data protected by the integrated processor 130 is encrypted with a new encryption key 241 before an outside entity can attempt to access the data through the communications controller 110. Therefore, even if a hacker observed the decryption process and was able to emulate the key 241, by the time the hacker attempted to use his key, the original key 241 would have been replaced by a new key 241 thus foiling the hacker's attempt to gain access to secure data.

In another embodiment of the present invention, the cycle speed of the integrated processor 130 is several times faster than the input/output speed of the communications controller 110 and the distribution device's computer interface. This allows encryption to occur in real time transparently to the computer or host system, making it impossible for a software pirate to hack the application. Such an encryption scheme can be applied to the entire volume of data stored in storage module 140 by ensuring enough space is reserved to mirror the data, and the speed of the distribution device's integrated processor 130 is sufficient to support the cipher of the entire data stored in storage module 140 in real time.

A further embodiment of the present invention is to distribute digital content using an encrypted component distribution system. Such a system allows for the delivery of an independent and discrete encryption key 241 that is stored on a programmable memory component. This key acts to decrypt encrypted digital content such as material contained on audio or video disks on a case by case basis. Such a distribution facilitates the delivery of discretely encrypted media on a per-product, per-production run basis. Unlike the content scrambling system (CSS) (CSS is the DVD encoding standard), the encrypted component distribution system of the present invention does not suffer from the limitations and security issues of using a limited, previously shared pool of keys. In the present invention, a distinct key 241 can be assigned to every disk coming off a production line.

Figure 4:
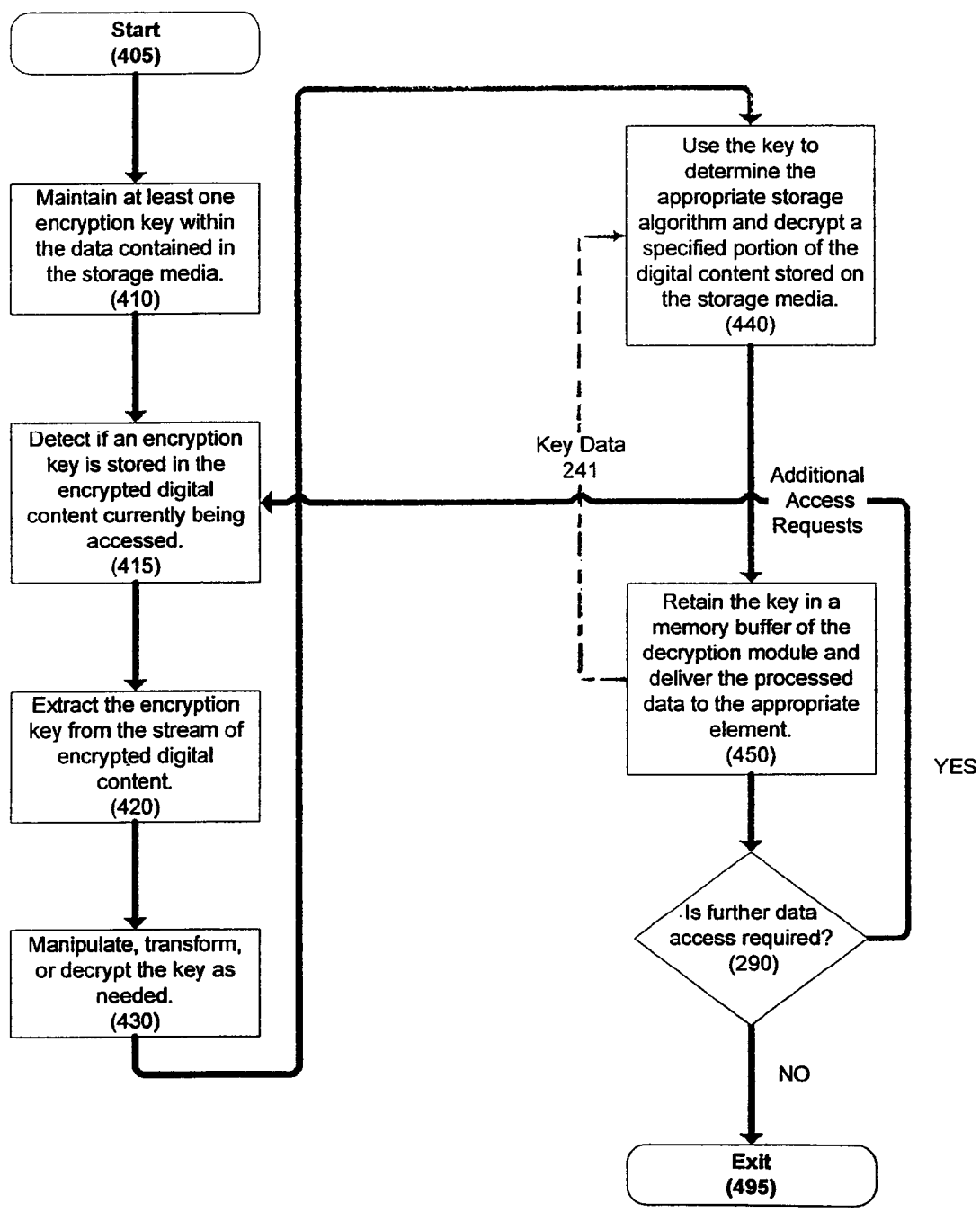
FIG. 4 is a flow diagram of one method embodiment of the present invention for distributing digital content using an encryption component distribution system.

One embodiment of an encryption component distribution system using virtual keying is shown in FIG. 4. In virtual keying, an encryption key is stored 410 in a digital format on the storage media itself amongst the digital content. As the digital content is received, the encryption key 241 is detected 415. To be useful, the integrated processor 130 or a similar type of device extracts 420 and processes 430 the encryption key 241. The key 241 may also be used to decode 440 the encrypted digital content stored in the storage module 140 of the distribution device 100 or digital content on a similar storage medium. After decryption, the key 241 is retained 450 in a local memory buffer within the decryption module 640 (i.e. the integrated processor 130) until a new stream of data is detected. When a new stream of data is detected carrying with it an unprocessed key 241 directed to the decryption module 640, the key 241 is harvested by the integrated processor 130 and used to decrypt the remaining digital content. When unencrypted data is detected at the decryption module 640, the buffer is cleared and the data passes through the decryption module 640 unchanged to a digital to analog converter 670. Ideally, the digital to analog converter 670 is integrated into the distribution device 100 or similar storage medium.

Figure 5:
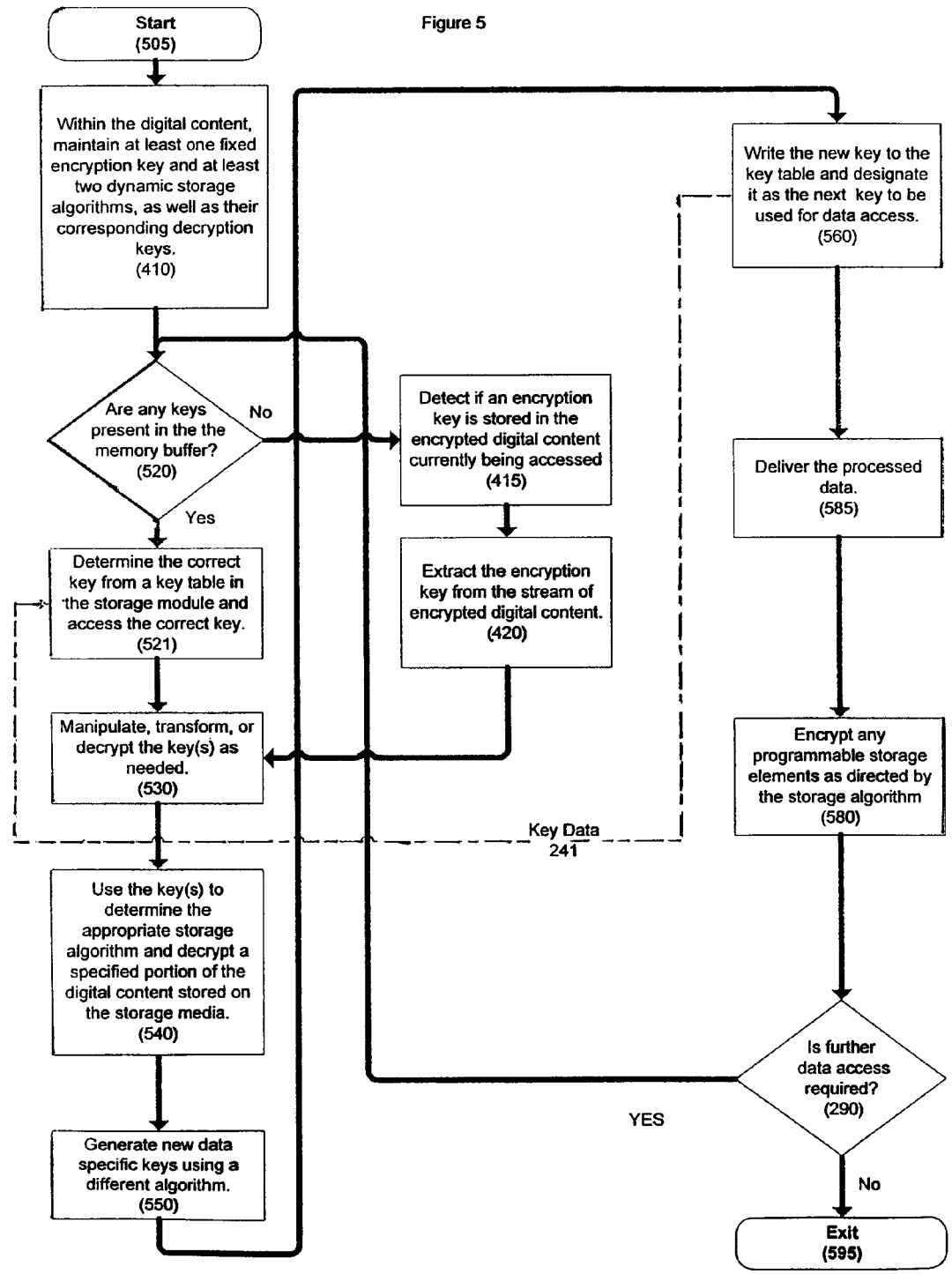
FIG. 5 is a flow diagram of one method embodiment of the present invention for distributing digital content using a combination of dynamic and fixed encryption keys.

An additional embodiment of the encryption methodology is possible by integrating virtual keying with dynamic encryption as shown in FIG. 5. In this embodiment, both keying systems are present on the storage media at all times and can be used interchangeably, alternatively, or cooperatively. The present invention thereby possesses the flexibility to accommodate differing security schemes for different applications. In this embodiment of the present invention, at least one of the keying methodologies is actively maintaining a key. Furthermore, storage algorithms can be found in the distribution device 100. Any keys present are detected 520. In the case of a dynamic key the current key is loaded 521 from the key storage element. When the embodiment comprises a virtual key the data being accessed is examined 415 for a key

241. When a key 241 is located it is extracted 420 from the data and manipulated 530 by the integrated processor 130. At this point the appropriate storage algorithm is selected 540 to decode, manipulate, and/or process 545 the stored data. A new key is generated 550 and written 560 to the key storage element as the processed data is delivered 570 to the host computer 710. The storage algorithm then directs 580 the internal processor 130 to execute any manipulations on the stored data. The process continuously detects 520 new keys as long as data is accessed 590.

Figure 6:
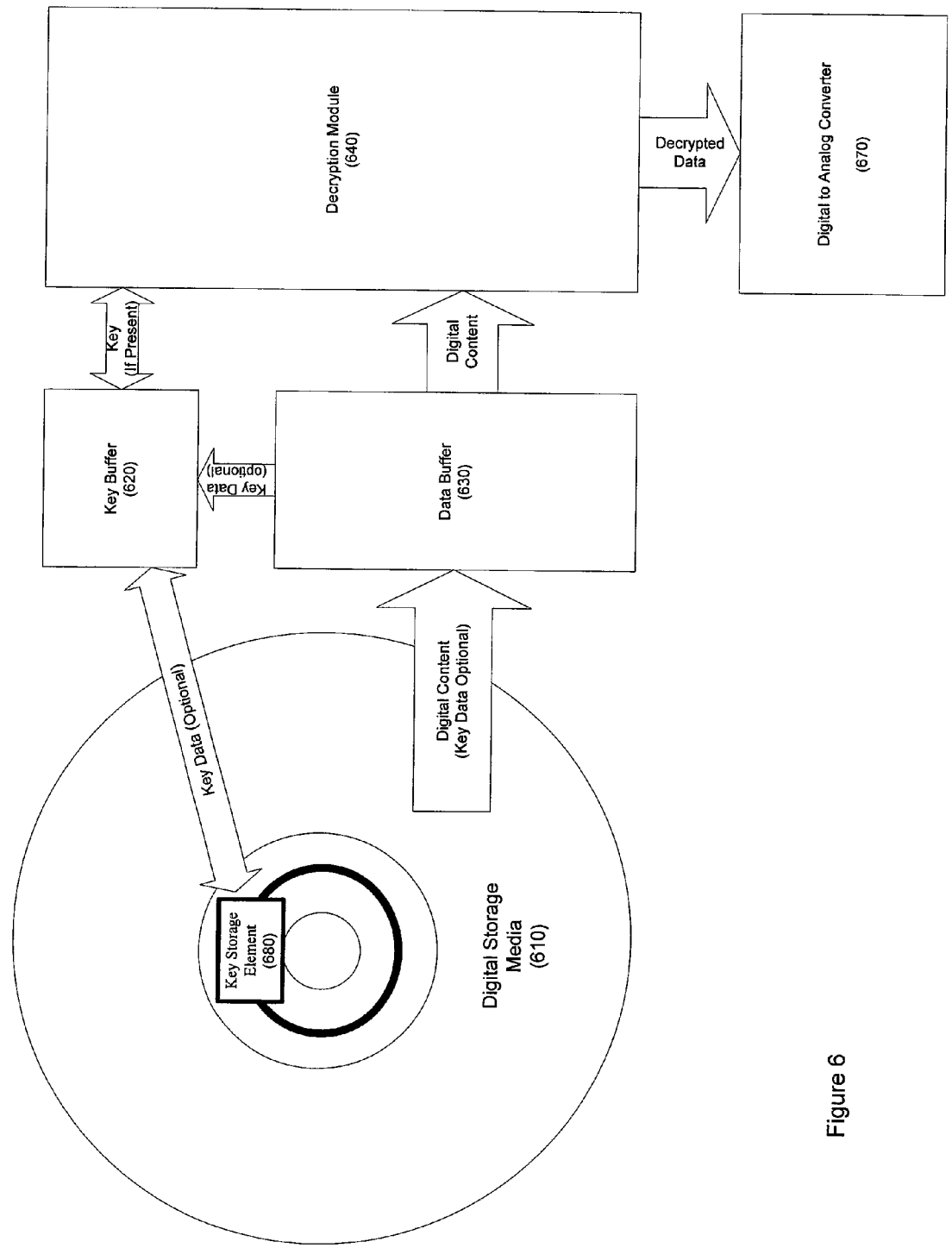
FIG. 6 is a block diagram of one embodiment of the present invention for securely distributing digital content.

One embodiment of encryption component distribution is further illustrated in the block diagram of FIG. 6. Encrypted digital content 630 is stored on a digital storage medium 610 such as a compact disk, digital video disk, mini disk, or the like. In one embodiment, the encryption key 241 is obtained directly from the storage medium 610 and communicated to a decryption module 640. Information about the storage medium such as the number of tracks, title, etc. may also be loaded into the receiver's memory. In another embodiment of the present invention, the encryption key 241 is stored with the digital content 630. In this situation, the encryption key 241 is harvested from the associated digital content 630 and communicated to the decryption module 640. The decryption module 640 manipulates the key 241, uses it to decrypt 440 the digital content, and passes it to a digital to analog converter 670. Unlike the previous embodiments, the decryption module 640 is separate from the digital content, yet all processing of the keys is executed within a processor 130 coupled inline between the data buffer 630 and the digital to analogue converter 670. The encrypted data is processed in memory by the processor 130 using an encryption key 241. While this processing is being accomplished, the data, key, or decryption algorithms are never exposed to the host computer or host device 710. Likewise, where the encryption key 241 would normally be stored in the storage module 140 of the distribution device 100, the encryption key 241, in this embodiment, is stored on the storage medium 610 with the encrypted content and, in another embodiment, wirelessly transmitted to the decryption module 640 via Radio Frequency Identification (RFID) or the like.

In this embodiment, the digital stream of data from the digital storage medium 610, such as an audio or video disk, is passed unaltered in its original digital format to the decryption module 640, where it is decrypted and forwarded to a digital to analog converter 670. The present invention prevents access to decrypted digital content before it is converted to analog data.

In one embodiment of the present invention, a memory device 680 is attached or embedded within the clamping area, ideally between 26 mm and 33 mm from the center of the disk to facilitate communication of the encryption key 241. Should a wireless device be used to communicate the encryption key 241 to the decryption module 640, an antenna can occupy any unused portions of the disk from 15 mm to 46 mm of the center along with or instead of physical contacts.

Figure 7:
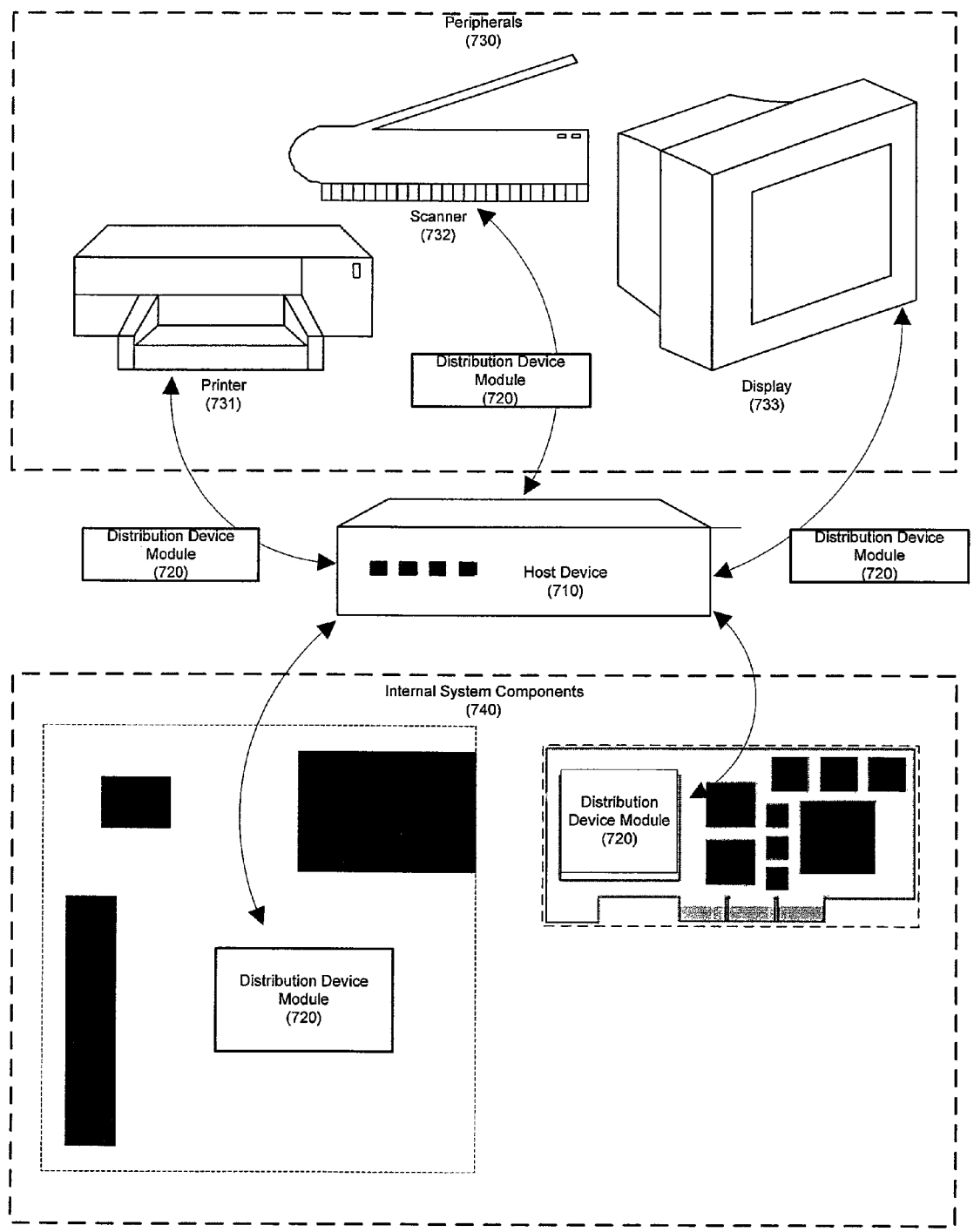
FIG. 7 is a block diagram of one apparatus embodiment of the present invention for a flash memory driver delivery system.

When the decryption module 640 is permanently integrated into an independent media player and used to decode audio and video independent of any form of software distribution, the system becomes completely backward compatible with existing media. When a traditional (non-encrypted) audio or video disk is played in a player enabled with the present invention, the decryption module will have no codes with which to decrypt the media, and the digital content will pass the digital data stream unchanged to the digital to analog converter. As described herein, the encryption/decryption key 241 is passed to a dedicated decryption module 640. The keys 241 are dynamic in that they can be changed or replaced with other keys 241 that may be stored in different remote locations on the storage medium and use different algorithms and/or encryption techniques. As the encryption key 241 is field programmable, it possesses the capability to frequently alter the encryption algorithm as well as convey processing instructions separately to the encryption/decryption methodology FIG. 7 is a block diagram of one embodiment for a flash memory driver delivery system. A host computer 710 is communicatively coupled with a printer 731, monitor 733, or similar peripheral component through cabling, a wireless connection, or other means known to one skilled in the art. By integrating a distribution device module 720 into the bus architecture (IO) of a peripheral component, (i.e., a printer 731, sound card, video card, monitor 733, home automation system, or similar device), delivery of the software component such as, in one embodiment, the driver, becomes as simple as plugging in the device. As opposed to the current technology that requires installation of driver software into the computer operating system to allow the peripheral to be properly recognized and later utilized, a distribution device module 720 ensures immediate installation of the appropriate software as the peripheral is physically connected to the host computer. For example, in the case of a printer 731 needing a driver to interface and operate with a host computer 710, a cable having a distribution device module 720 can attach any printer to any computer and truly be a plug and play device.

In such an embodiment, the distribution device module 720 residing in the peripheral contains drivers for communicating with the printer 731. In one embodiment, the distribution device module 720 automatically installs the device driver onto the host computer in the traditional way. In another embodiment, the flash distribution device module 720 delivers the driver as a distribution device module 720 and functions as an intermediary device negotiating access to the peripheral. In such a scenario, as a new cable is plugged into a host computer 710, the computer 710 recognizes it is a flash memory device. Upon being recognized by the host computer 710, the ubiquitous nature of the cable determines the operating system of the host computer 710 and either installs the driver into the computer 710 or acts as an intermediary to communicate data to and from the printer 731. Furthermore, hardware component manufactures may directly integrate the distribution device module 720 into their bus architecture or cables to include a distribution device module 720 with device specific, or manufacturer specific drivers built into or attached to the cable.

Yet another embodiment of the present invention comprises storing user information, software licenses, network access levels, software, documents, email, electronic mail authentication, custom settings and configurations, or the like on a distribution device 100 module. The module 100 can be assigned to operate on a specific computer or one of several computers operating in a network. The device 100 can also be password protected. In this embodiment, the ability to store user specific information can be combined with nonvolatile memory 140 and distribution device 100 based software modules to allow a user to travel with all his or her information and software. Furthermore, the user can access and use any PC to have full access to his or her live desktop on that computer regardless of network or internet access.

Flash memory distribution device 100 based software and live desktops can benefit from architecture tailored to support them. A flash distribution device 100 terminal relies on nonvolatile memory 140 modules, associated with a flash device 100 loaded with the graphic user interface, "live desktop," and software, to function. Unlike current shared bus architecture where multiple devices share the same path to a central processor, flash memory supported modules of the present invention are able to dynamically communicate with one another across a switch fabric, reducing latency and eliminating core processor dependence. Furthermore, flash memory distribution devices 100 are capable of distributed application sharing with each other in a superscalar architecture that allows a network's processing power to grow as the number of terminals increases. In this way, the spare clock cycles of any application processor within a given network can be used to accelerate the processes of any terminal within the network.

While it is contemplated that the present invention will be used on network computers, it is possible to apply the methodology presented here to network environments with multiple computers in several locations. Although not required, method embodiments of the invention can be implemented via computer-executable instructions, such as routines executed by a general purpose computer, e.g., a server or client computer. The computer-executable instructions can be embodied in hardware, firmware, or software residing on at least one computer-readable medium, such as one or more hard disks, floppy disks, optical drives, Flash memory, Compact Disks, Digital Video Disks, etc. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers, and the like. The invention can be embodied in a special purpose computer, integrated processor, or data processor that is specifically programmed, configured, or constructed to perform at least one of the computer-executable instructions as explained herein. Indeed, computer, as used generally herein, refers to any of the above devices and systems, as well as any data processor. The invention can also be practiced in distributed computing environments where tasks or modules are performed by remote processing devices linked through a communications network. In a distributed computing environment, program modules may be located in both local and remote memory storage devices.

The above description is included to illustrate the operation of various embodiments of the invention and is not meant to limit the scope of the invention. The elements and steps of the various embodiments described above can be combined to provide further embodiments. The scope of the invention is to be limited only by the following claims. Accordingly, from the above discussion, many variations will be apparent to one skilled in the art that would yet be encompassed by the spirit and scope of the present invention.

The invention claimed is:

1. A method for securely distributing digital content, the method comprising:
   maintaining at least two encrypted enumerated lists on a nonvolatile storage medium, wherein each encrypted enumerated list identifies different locations of identically encoded digital content stored on the nonvolatile storage medium;
   associating a separate encryption key and storage algorithm with each encrypted enumerated list, defining a first key associated with a first enumerated list and a second key associated with a second enumerated list;
   establishing functional communications between the nonvolatile storage medium and a host computer;
   receiving from the host computer at least one request for content associated with the lists via a device driver, wherein the device driver is interposed between the nonvolatile storage medium and the host computer;
   accessing the first enumerated list;
   accessing the first encryption key;
   decrypting the first enumerated list and a storage algorithm with the first encryption key wherein the storage algorithm is read directly to a processor for execution;
   caching digital content from the location on the nonvolatile storage medium as identified by the first enumerated list;
   generating a new first encryption key for the first enumerated list;
   moving the digital content to a new location on the nonvolatile storage medium according to the storage algorithm and updating the first enumerated list;
   assigning a binary operator to the first enumerated list, wherein the binary operator associates the new first encryption key with the first enumerated list;
   encrypting the updated first enumerated list with the new first encryption key; and
   distributing digital content associated with the first enumerated list to the host computer via the device driver subsequent to moving the encoded digital content and encrypting the first enumerated list with the new first encryption key and wherein subsequent requests for content uses the second enumerated list.

2. The method of claim 1 wherein encrypting the first enumerated list with the new first encryption key occurs upon expiration of a predetermined period.

3. The method according to claim 1 wherein encrypting the first enumerated list and digital content occurs internally on an integrated processor on the nonvolatile storage medium and apart from the host computer.

4. At least one non-transitory computer-readable medium containing computer program instructions executable by a machine for securely distributing digital content, the computer program instructions performing the steps of:
   maintaining at least two encrypted enumerated lists, wherein each encrypted enumerated list identifies different locations of identically encrypted digital content stored on a storage medium;
   associating an encryption key and a storage algorithm with each encrypted enumerated list,
   receiving at least one request for content associated with the lists;
   decrypting a first enumerated list and caching content associated with the at least one request;
   moving content associated with the at least one request to a new location according to the storage algorithm and updating the first enumerated list on each data access pass;
   encrypting the updated first enumerated list with a new encryption key; and
   distributing decrypted contents associated with the first enumerated list to the host computer subsequent to moving the encrypted digital content and encrypting the first enumerated list with the new first encryption key and wherein subsequent requests for content uses a different enumerated list.

5. The non-transitory computer-readable medium of claim 4 wherein the computer program instruction further include encrypting the first enumerated list with the new first encryption key upon expiration of a predetermined period.

* * * * *